July 12, 1966
R. B. JONES
3,260,119
PRESSURE GAUGE CONNECTOR MEANS
Filed Nov. 22, 1963
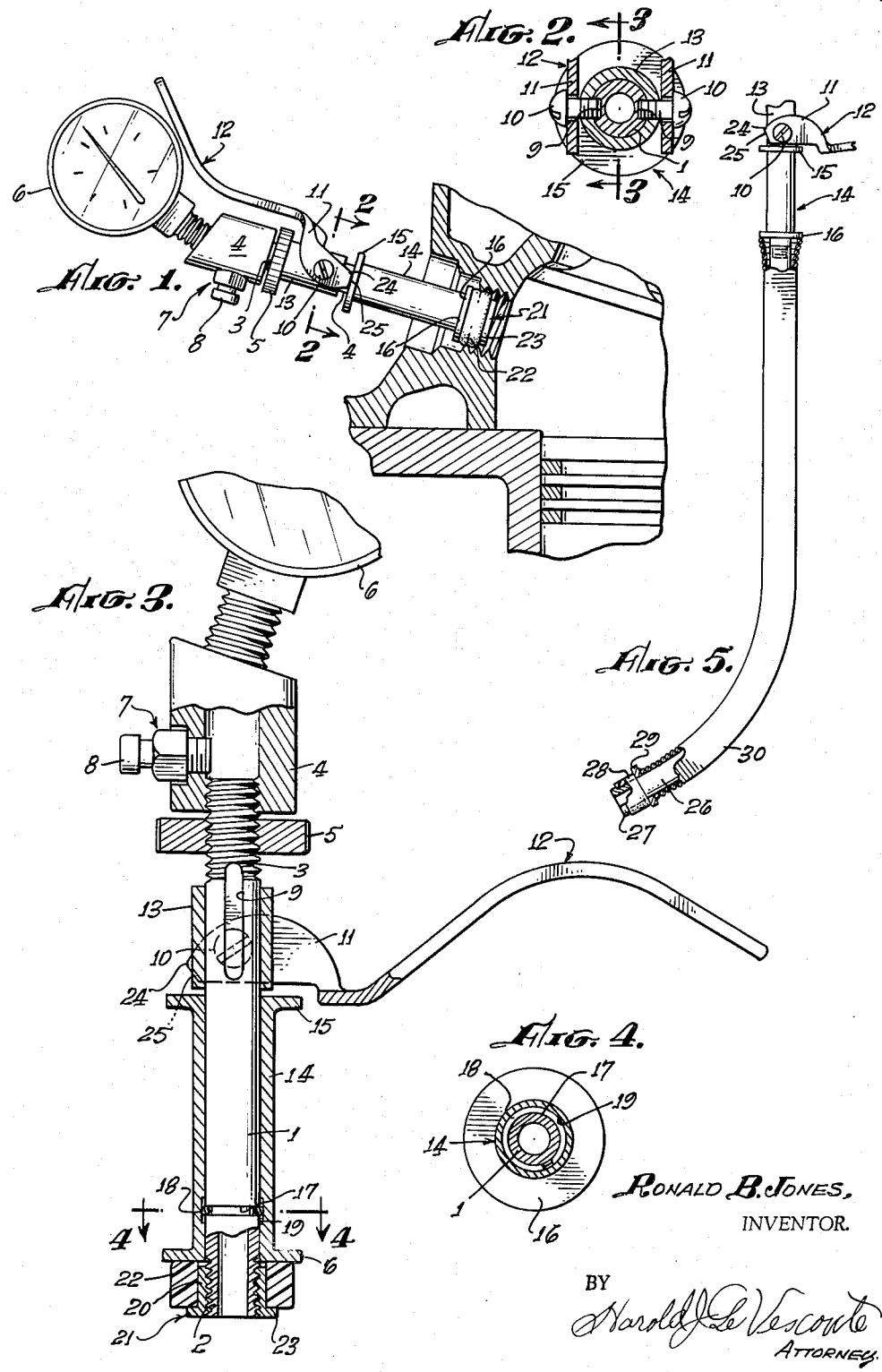
RONALD B. JONES,
INVENTOR.
BY
Harold J. LeVesconte
ATTORNEY.

United States Patent Office 3,260,119
Patented July 12, 1966

3,260,119
PRESSURE GAUGE CONNECTOR MEANS
Ronald B. Jones, 2341 Luana Lane, Glendale, Calif.
Filed Nov. 22, 1963, Ser. No. 325,535
8 Claims. (Cl. 73—420)

This invention relates to servicing equipment for vehicle and other engines and more particularly to a means for quickly ascertaining the compression developed in the individual cylinders of an engine. In testing the compression of such engines, the practice and equipment heretofore employed comprises a pressure gauge fitted with a threaded connection which is applied to the spark plug hole of the cylinder. This screwing of the gauge fitting into and out of the spark plug holes is both tedious and time consuming and in some cases is particularly difficult by reason of the location of the spark plug hole in the cylinder head.

Recognizing the problems that exist with the currently employed equipment, the present invention has for its principal object the provision of the pressure ascertaining gauge means provided with devices operable to effect quick, pressure tight connection with the spark plug hole in an engine cylinder and equally quick disengagement therefrom.

Another object of the invention is to provide a pressure gauge connection with a spark plug hole of an engine cylinder comprising in part, a cylindrical, resilient bushing-like element and means for subjecting said element to axial compression with resultant radial expansion thereof into leakproof engagement with the threads of a spark plug hole of an engine prior to the imposition of compression pressure on the gauge.

Another object of the invention is to provide a gauge and attaching means therefor embodying the foregoing objectives and which, additionally, is attachable to a spark plug hole disposed at an angle to a point at which a pressure gauge attached thereto may be observed.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a side elevational view of a first embodiment of a device embodying the present invention as attached to a spark plug hole of an engine cylinder, FIG. 2 is an enlarged scale, transverse section taken on the line 2—2 of FIG. 1, FIG. 3 is a longitudinal medial sectional view of the first embodiment of the device as viewed on a medial plane indicated by the line 3—3 of FIG. 2, the device being positioned as if inserted in a vertically disposed spark plug hole, FIG. 4 is a transverse sectional view taken in a plane represented by the line 4—4 of FIG. 2, and FIG. 5 is a fragmentary side elevational view, partly in section, of a second embodiment of the invention.

Referring to the drawings, the first embodiment of the device comprises a tubular body member 1 threaded at one end as at 2 to receive interchangeable means for engaging various sizes and locations of spark plug holes and threaded at its opposite end as at 3 for engagement with one end of a fitting 4, said threads also serving to support an adjustable abutment nut 5 to which further reference will be made. The fitting 4 carries a pressure gauge 6 maintained in communication with the interior of the tubular body member 1 and also carries a normally closed relief valve 7 manually operable by pressing inwardly on the button element 8 thereof to effect communication of the interior of the device with atmosphere to release any pressure within the device.

Inwardly of the threaded end 3 thereof, the exterior of the body member 1 is provided with a pair of diametrically opposite longitudinally extending slots 9, 9 which are slidingly engaged by the ends of a pair of screws 10, 10 which extend through the forked ends 11, 11 of a hand operated cam lever 12 and are thence threaded into holes in a collar 13 slidingly mounted on the body member. The screws 10, 10 thus serve to prevent the collar 13 from turning on the body member while allowing it to have limited endwise movement thereon and also serve as pivots for the operating cam lever 12. Slidingly mounted on the body member 1 between the sleeve 13 and the threaded end 2 is a sleeve 14 having a first flanged end 15 adjacent to the collar 13 and a second flanged end 16 adjacent to and preferably slightly overlapping the inner portion of a threaded end 2. Adjacent to the threaded end 2 thereof, the body member 1 is provided with a circumferential groove 17 in which is seated a spring wire ring 18, the bias of said ring being such as to tend to cause it to spread outwardly from the groove 17. The opposite inner face of the sleeve 14 is provided with a wide shallow groove 19 and the ring 18, by reason of its size and the said bias, engages both the groove 17 and the groove 19 thus serving to lock the sleeve 14 on the body member 1 while allowing limited axial and rotational movement thereon, the extent of such axial movement being determined by the width of the groove 19.

Threaded on the end 2 of the body member 1 is the shank 20 of a compressor member 21 carrying a wide, thick, resilient ring 22 of rubber or equivalent resilient, compressible material, the side faces of said ring being engaged, respectively, by the flange 16 and by the flange 23 which is disposed at the outer end of the shank 20 of the compressor member 21. The outer diameter of the ring 22 is such as will fit closely into the minor diameter of the threads of a spark plug hole of the size for which it is intended when the lever 12 is in the position shown in FIG. 3. When the ring 22 is thus inserted in a spark plug hole and the lever 12 is swung from the position shown in FIG. 3 to the position shown in FIG. 1, the cam face corners 24, 24 on the lever ends 11, 11 engage the outer face of the flange 15 causing the sleeve 14 to move toward the compresor with the collar 3 disposed in abutting engagement with the nut 5. This results in axial compression of the ring 22 causing it to expand radially and tightly engage the threads of the spark plug hole by reason of the said radial expansion. The flat end faces 25 of the lever ends 11 are disposed to be parallel with the face of the flange 15 (see FIG. 1) and thus releasably lock the lever in the position in which the device is thus mounted in a spark plug hole. After thus mounting the device, the engine can be turned over and the pressure developed in the cylinder noted. Also, after reading maximum pressure, the engine can be left or held in that position to permit observation of the rate and extent of compression loss if any. When it is desired to repeat the test on the same cylinder, pressing on the valve button 8 will quickly dissipate the pressure in the device for the next test or for removing the device from a cylinder.

dissipate thep ressure in the device for the next test or for removing the device from a cylinder.

Some engines have the spark plug holes so located that the short straight form of attaching means comprising the use of the flange 16 directly against the expandable ring 22 cannot be employed. To accommodate such engines, differently shaped extensions may be provided as substitutes for the compressor 21. By way of example, the long curved tube 26 shown in FIG. 5 may be employed. Said tube is internally threaded at one end to threadably engage the end 2 of the body member 1 as a substitute for the compressor member 21. The opposite end of the tube is provided with a flange 27 serving as an outer end abutment for a resilient ring 28 comparable to the ring 22. Slidingly mounted on the tube 26 and engaging the opposite end surface of the ring 27 is a washer 29 and freely slidable on the exterior of the tube 26 and extending from the washer 29 to the flange 16 of the sleeve 14 is a tightly coiled spring 30. Preferably, the washer 29 is attached to the end of the spring with which it is intended to be in contact. When the tube 26 is tightly screwed onto the end 2 of the body member 1, the end of the spring adjacent to that end of the tube will be in substantial engagement with the flange 16. If there is any required difference in adjustment, the nut 5 forms a suitable variable adjustment. When the resilient ring 28 is inserted in the spark plug hole and the lever 12 is swung to the position shown in FIG. 1, the resilient ring 28 will be radially expanded into tight engagement with the threads of the spark plug hole into which it is inserted. Obviously, these attachments can be made in any configuration desired to suit particular spark plug hole locations in engines that cannot be reached by the means constituting the first embodiment of the invention and, additionally obviously, these expandable rings may be made in sizes to accommodate the different sizes of spark plug holes.

By the use of this device, the compression factor and performance of an engine can be quickly investigated and determined without the necessity of laboriously attaching the pressure gauge to a cylinder by threading it into the spark plug holes with pressure resisting tightness.

While in the foregoing specification there have been disclosed certain presently preferred embodiments of the invention, such disclosure has been by way of example, wherefore, such disclosure will not be deemed to constitute any limitation and it will be understood that the invention includes as well all such changes and modifications in the parts and in the construction, combination and arrangement of parts as shall come within the purview of the appended claims.

I claim:

1. A means for quickly connecting and disconnecting a pressure gauge with the spark plug hole of an engine cylinder at a time when the cylinder is subjected only to atmospheric pressure, said means comprising a tubular body member having the interior thereof connected at one end to the pressure gauge and having an axially compressible, radially expandable resilient element and supporting means therefor mounted at the opposite end thereof, said resilient element when unexpanded, being capable of insertion into the spark plug hole of an engine cylinder to which the pressure gauge is to be connected, and manually operable means including a component axially movable on said body member effective in cooperation with said supporting means to apply axial compression on said resilient element with resultant radial expansion of said element into pressure tight connection with the spark plug hole into which it has been inserted.

2. A pressure gauge connecting means as claimed in claim 1 in which said manually operable means includes a cam lever having pivot means slidably mounted on said body member and additionally having engageable with said axially movable component to effect said axial compression and radial expansion of said resilient element.

3. A pressure gauge connecting means as claimed in claim 2 in which said manually operable means comprises a first sleeve axially slidable on said body member at the end thereof to which the pressure gauge is connected and on which sleeve said cam lever is pivotally mounted for movement about an axis transverse to the axial line of said body member and in which said axially movable component comprises a second sleeve axially slidable on said body member and having one end thereof engaging said resilient element and the opposite end disposed for engagement by said cam lever.

4. A pressure gauge connecting means as claimed in claim 3 in which said first named sleeve carries a pair of screws projecting in axial alignment with each other from opposite sides thereof and serving both as pivot means for said cam lever and, additionally, at least one of said screws having engagement with said body member effective both to limit the extent of axial movement of said first named sleeve on said body member and preventing rotational movement of said first named sleeve on said body member.

5. A pressure gauge connecting means as claimed in claim 3 including means interposed between said body member and said second sleeve effective both to retain said second sleeve on said body member and to limit the permissible extent of axial movement thereof on said body member.

6. A pressure gauge connecting means as claimed in claim 1 in which said body member carries adjustable means operable by adjustment thereof to vary the extent of axial compression applied to said resilient element by said manually operable means.

7. A pressure guage connecting means as claimed in claim 1 in which said body member carries a tube affixed thereto at the end thereof opposite the end to which said gauge is connected, said tube being curved and carrying said resilient element at the distal end thereof, and in which said tube carries means on the exterior thereof engaged by said manually operable means and operated thereby to effect axial compression and radial expansion of said resilient element.

8. A pressure gauge connecting means as claimed in claim 7 in which said manually operable means comprises a first sleeve axially slidable on said body member at the end thereof to which the pressure gauge is connected and on which sleeve said cam lever is pivotally mounted for movement about an axis transverse to the axial line of said body member and a second sleeve axially slidable on said body member having one end thereof engaging said means on the exterior of said tube and the opposite end thereof disposed for engagement by said cam lever.

References Cited by the Examiner

UNITED STATES PATENTS 2,862,386   12/1958   Campbell et al. _____ 73—420
3,048,428   8/1962   Ransom _____ 285—338 X LOUIS R. PRINCE, *Primary Examiner.*

DAVID SCHONBERG, *Examiner.*

D. O. WOODIEL, *Assistant Examiner.*